(12) United States Patent
Park

(10) Patent No.: US 12,089,794 B2
(45) Date of Patent: Sep. 17, 2024

(54) MULTIPURPOSE CLEANING KIT

(71) Applicants:Platech Co., Ltd., Gyeonggi-do (KR); Chan Moon Park, Seoul (KR)

(72) Inventor: Chan Moon Park, Seoul (KR)

(73) Assignees: Chan Moon Park, Seoul (KR); Platech Co., Ltd., Paju-si (KR)

( * ) Notice: Subject to any disclaimer, the term of this patent is extended or adjusted under 35 U.S.C. 154(b) by 314 days.

(21) Appl. No.: 17/562,615

(22) Filed: Dec. 27, 2021

(65) Prior Publication Data
US 2022/0202270 A1 Jun. 30, 2022

(30) Foreign Application Priority Data

Dec. 29, 2020 (KR) .................. 10-2020-0186366
Dec. 9, 2021 (KR) .................. 10-2021-0175821

(51) Int. Cl.
| | | |
|---|---|---|
| *A47L 13/51* | (2006.01) | |
| *A47L 13/12* | (2006.01) | |
| *A47L 13/52* | (2006.01) | |
| *B60S 3/00* | (2006.01) | |
| *B60S 3/04* | (2006.01) | |

(52) U.S. Cl.
CPC ............ *A47L 13/51* (2013.01); *A47L 13/12* (2013.01); *A47L 13/52* (2013.01); *B60S 3/008* (2013.01); *B60S 3/045* (2013.01)

(58) Field of Classification Search
CPC .......... A47L 13/52; A47L 13/12; A47L 13/51; B60S 3/045; B60S 3/008

USPC ..................................... 15/104.001
See application file for complete search history.

(56) References Cited

U.S. PATENT DOCUMENTS 5,661,868 A * 9/1997 Panagakos ............... B25G 1/04
15/144.4
2021/0042475 A1 2/2021 Zhang et al.

FOREIGN PATENT DOCUMENTS

| KR | 19980057114 U | 10/1998 | |
| KR | 200184923 Y1 | 6/2000 | |
| KR | 102166658 B1 * | 10/2020 | ............ A47L 13/52 |

* cited by examiner

*Primary Examiner* — Katina N. Henson
(74) *Attorney, Agent, or Firm* — KIRTON McCONKIE; Evan R. Witt

(57) ABSTRACT

Disclosed herein is a multipurpose cleaning kit which can easily clean hard-to-reach places inside an automobile or a tent during car camping, which is currently popular among people, or camping. The cleaning kit can easily clean hard-to-reach places inside an automobile, such as cracks of seats, by allowing a dustpan having a defrosting scraper integrally formed therewith to be easily assembled with or disassembled from a broom having a brush securely inserted into a handle thereof and adapted to remove dust from air vents inside the automobile (air vents of an air-conditioner) and cracks of the seats, and can be made compact enough to be stored in a pocket on the back of a front seat of the automobile when the broom and the dustpan are assembled together.

5 Claims, 13 Drawing Sheets

MULTIPURPOSE CLEANING KIT

FIELD

The present invention relates to a multipurpose cleaning kit which can be used in various applications such as cleaning of the inside of an automobile or a tent during car camping, which is currently popular among people, or camping, and cleaning of home appliances or furniture, thereby providing numerous benefits to users, wherein the cleaning kit can easily clean hard-to-reach places inside an automobile, such as cracks of seats, by allowing a dustpan having a defrosting scraper integrally formed therewith to be easily assembled with or disassembled from a broom having a brush securely inserted into a handle thereof and adapted to remove dust from air vents inside the automobile (air vents of an air-conditioner) and cracks of the seats, and can be made compact enough to be stored in a pocket on the back of a front seat of the automobile when the broom and the dustpan are assembled together.

BACKGROUND

In general, a vacuum cleaner removing dirt or dust through suction into a body thereof is used to clean the inside of an automobile. However, since a suction tube of a general vacuum cleaner for automobiles is slightly thick, such a vacuum cleaner is not suitable for removing dust from hard-to-reach places such as corners inside the automobile or a crack between a seatback and seat cushion of a seat.

It is also almost impossible to remove dust from hard-to-reach places inside an automobile, such as cracks and corners, using a normal brush. Many users often use an adhesive roll cleaner. However, such an adhesive roll cleaner is also not suitable for removing dust from such hard-to-reach places due to the diameter of a roll.

In view of such problems, KR Utility Model Laid-open Publication No. 1998-057114 (published on Oct. 15, 1998) discloses a cleaning kit including: a brush having a handle formed on one side of a brush body and bristles formed at the other side of the brush body; and a dustpan having a storage groove formed on one side of a dustpan body to hold dust or trash and an insertion groove formed on a handle of the dustpan body above the storage groove and adapted for the brush body of the brush to be securely inserted thereinto.

However, the aforementioned cleaning kit has not been put to practical use due to inability to effectively remove dust from hard-to-reach places inside an automobile such as cracks and corners, despite having the advantage that the brush is inserted into and integrated with the dustpan.

RELATED LITERATURE

Patent Document (Patent Document 1) 0001) KR Utility Model Laid-open Publication No. 1998-057114 (entitled "Cleaning Kit", Issue date: Oct. 15, 1998)
(Patent Document 2) 0002) U.S. Patent Laid-open Publication No. 2005/0273966 (entitled "Dustpan with De-icing Scraper", Publication date: Dec. 15, 2005)
(Patent Document 3) 0003) KR Utility Model Publication No. 20-0184923 (entitled "Multipurpose Cleaning Tool for Automobiles", Issue date: Jun. 1, 2000)

SUMMARY

Embodiments of the present invention provide a multipurpose cleaning kit, which can easily clean hard-to-reach places inside an automobile, such as cracks of seats, by allowing a dustpan having a defrosting scraper integrally formed therewith to be easily assembled with or disassembled from a broom having a cleaning brush securely inserted into a handle thereof and adapted to remove dust from air vents inside the automobile (air vents of an air-conditioner) and cracks of the seats, and can be stored in a pocket on the back of the seat by allowing the broom and the dustpan to be assembled in compact form.

In accordance with one aspect of the present invention, a multipurpose cleaning kit includes: a dustpan body (100) having an inner space (140) defined by a bottom surface (110), an upper surface (120) and a side surface (130) with a defrosting scraper (150) formed thereon, the inner space (140) being adapted for trash to be swept thereinto; a broom body (200) having an insertion groove (220) formed at a lower portion thereof to allow a brush holder (210) retaining a brush (211) to be securely inserted thereinto and a cylindrical handle (230) formed at an upper portion thereof and having a receiving hole (240) receiving a cleaning brush holder (300) therein; and the cleaning brush holder (300) including a handle (310) securely retaining a cylindrical cleaning brush (330) therein.

The brush holder (210) of the broom body (200) may be inserted into and stored in the inner space (140) of the dustpan body (100) and the cleaning brush holder (330) may be inserted into and stored in the receiving hole (240) of the cylindrical handle (230) of the broom body (200).

According to the present invention, the cleaning kit can minimize a space required for storage and transportation by allowing the brush holder (210) of the broom body (200) to be inserted into and stored in the inner space (140) of the dustpan body (100) and allowing the cleaning brush holder (300) retaining the cylindrical cleaning brush (330) to be inserted into and stored in the receiving hole (240) of the broom body (200). Thus, the cleaning kit can be made compact enough to be stored in a pocket on the back of a front seat of an automobile or in a lower space inside a driver's door or a front passenger's door.

When the cleaning kit is in use, the cylindrical cleaning brush (330) is withdrawn from the receiving hole (240) of the broom body (200), whereby a user can easily remove dust from hard-to-reach places inside an automobile, such as air vents of an air conditioner and cracks of the seats, using the cylindrical cleaning brush (330). The brush holder (210) of the broom body (200) is used as a normal broom. A user can thoroughly clean the inside of the automobile, including a crack between the seatback and seat cushion of the seat, using the brush (211) with their hand grasping a grip of the brush.

In addition, the dustpan body (100) is used to collect and discard trash and dust from the inside of the automobile, and the defrosting scraper (150) protruding from the side surface (130) of the dustpan body (100) is used to remove frost from windows of an automobile in winter.

The cleaning kit according to the present invention can easily clean hard-to-reach places, which are difficult to clean using a normal cleaning tool, and can be used to clean the inside of an automobile and the inside of a tent during car camping or camping due to ability to be made compact enough to be stored in a pocket on an automobile seat or the like.

DRAWINGS

The above and other aspects, features and advantages of the present invention will become apparent from the following description of embodiments given in conjunction with the accompanying drawings, in which.

Figure 13A:
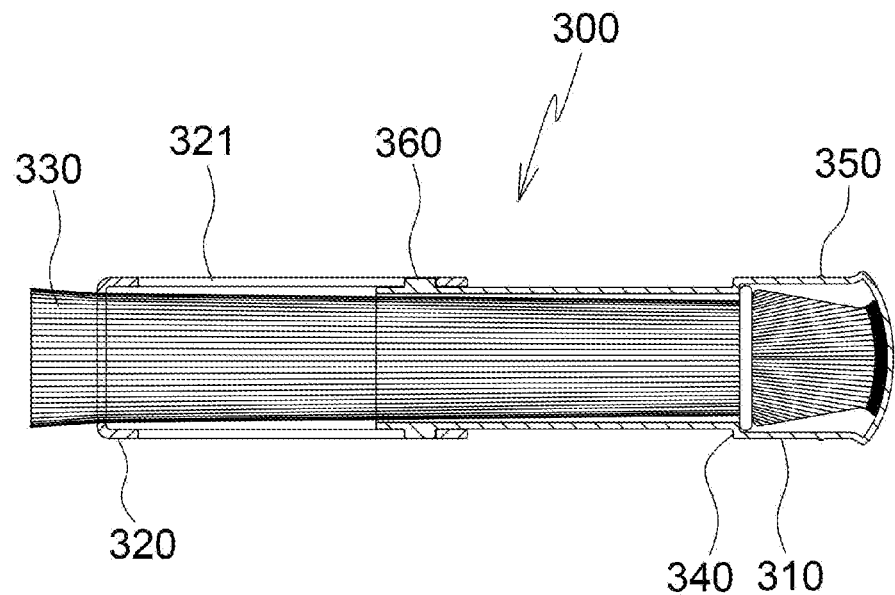
Figure 13B:
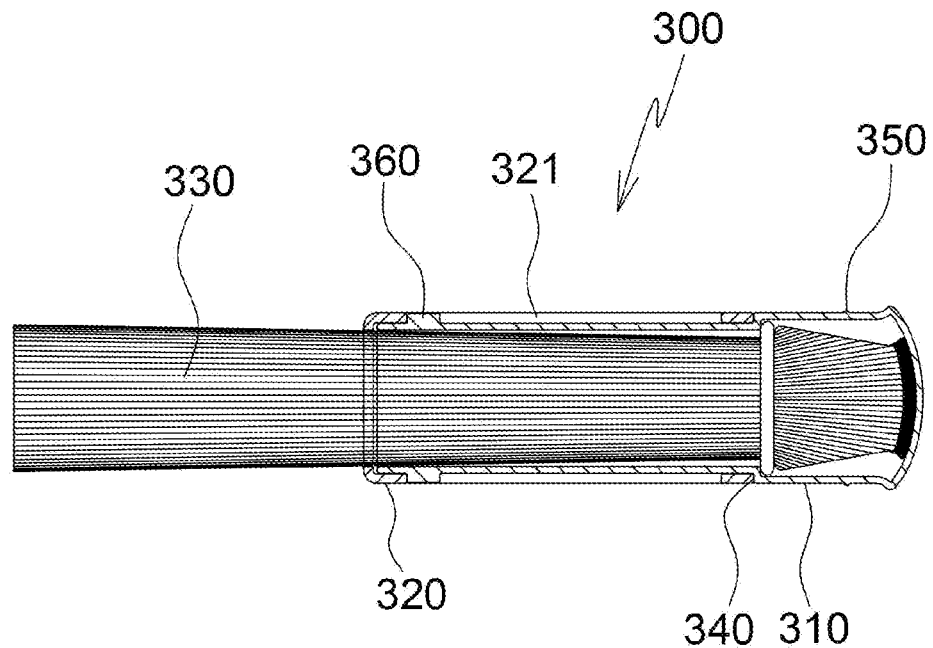

FIG. 13(a) is a longitudinal sectional view of the cleaning brush holder according to embodiment 2, illustrating a state in which bristles of a cleaning brush are gathered through movement of the sleeve (a state in which the cleaning brush holder is ready for insertion into a receiving hole of the broom body); and FIG. 13(b) is a longitudinal sectional view of the cleaning brush holder according to embodiment 2, illustrating a state in which a sleeve is moved such that the cleaning brush is ready for use.

DETAILED DESCRIPTION

Hereinafter, embodiments of the present invention will be described with reference to the accompanying drawings such that the present invention can be easily implemented by those skilled in the art.

It should be understood that the present invention may be embodied in different ways and is not limited to the following embodiments.

It should be noted that all the drawings are diagrammatic and not drawn to scale.

In the drawings, relative dimensions and proportions of parts may be exaggerated or reduced in size for the sake of clarity and convenience. Accordingly, the drawings are to be regarded as illustrative in nature and not as restrictive.

In addition, it should be noted that like structures, elements, or components will be denoted by like reference numerals throughout the specification and the accompanying drawings.

Figure 1:
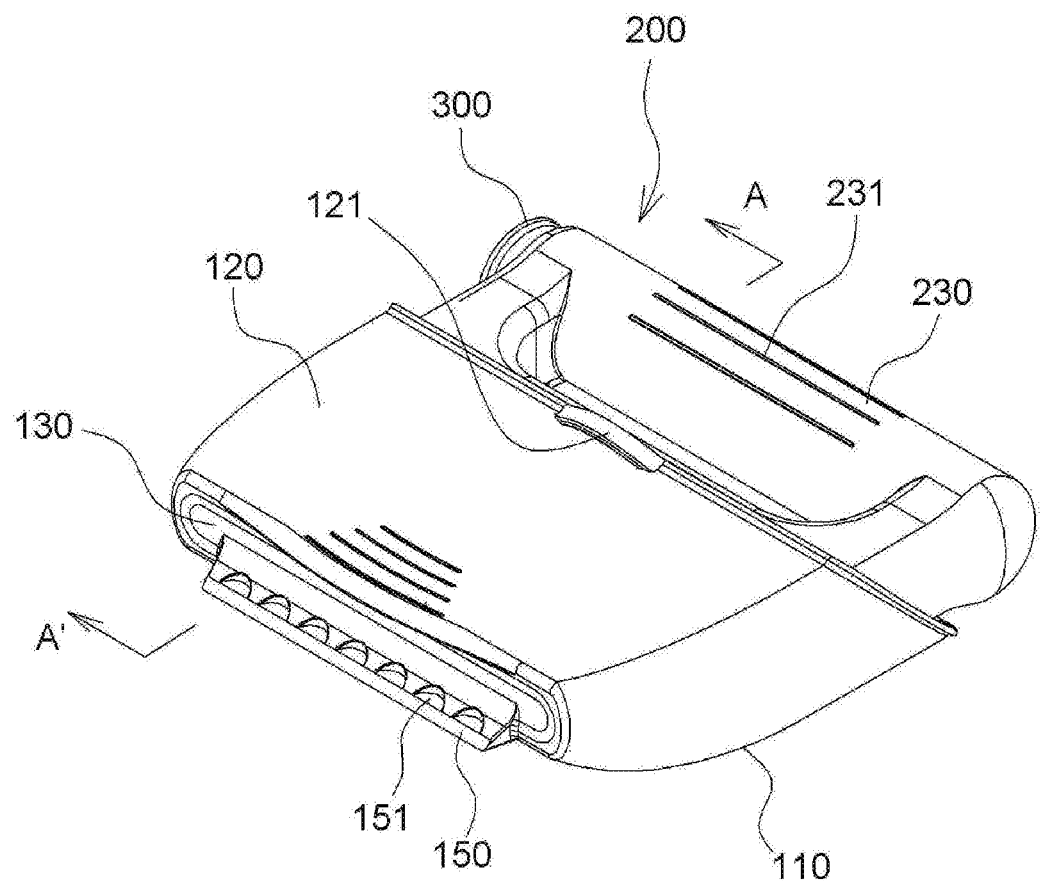
FIG. 1 is a perspective view of a multipurpose cleaning kit according to the present invention, with a dustpan body, a broom body, and a cylindrical cleaning brush holder assembled together.
Figure 2:
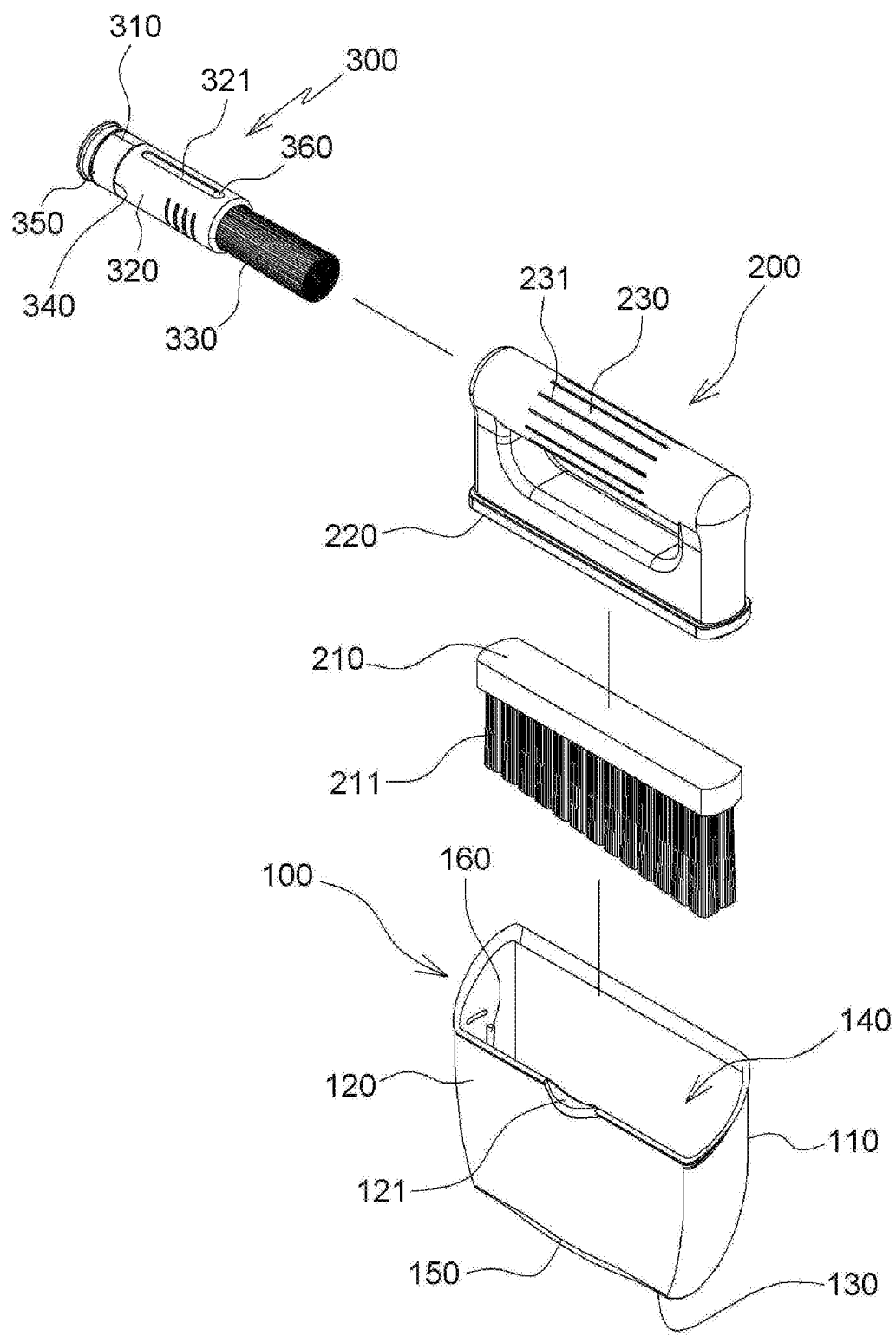
FIG. 2 is a perspective view of the multipurpose cleaning kit according to the present invention, with the dustpan body, the broom body, and the cylindrical cleaning brush holder separated from one another.

FIG. 1 is a perspective view of a multipurpose cleaning kit according to the present invention, with a dustpan body, a broom body, and a cylindrical cleaning brush holder assembled together, and FIG. 2 a perspective view of the multipurpose cleaning kit according to the present invention, with the dustpan body, the broom body, and the cylindrical cleaning brush holder separated from one another.

Figure 3:
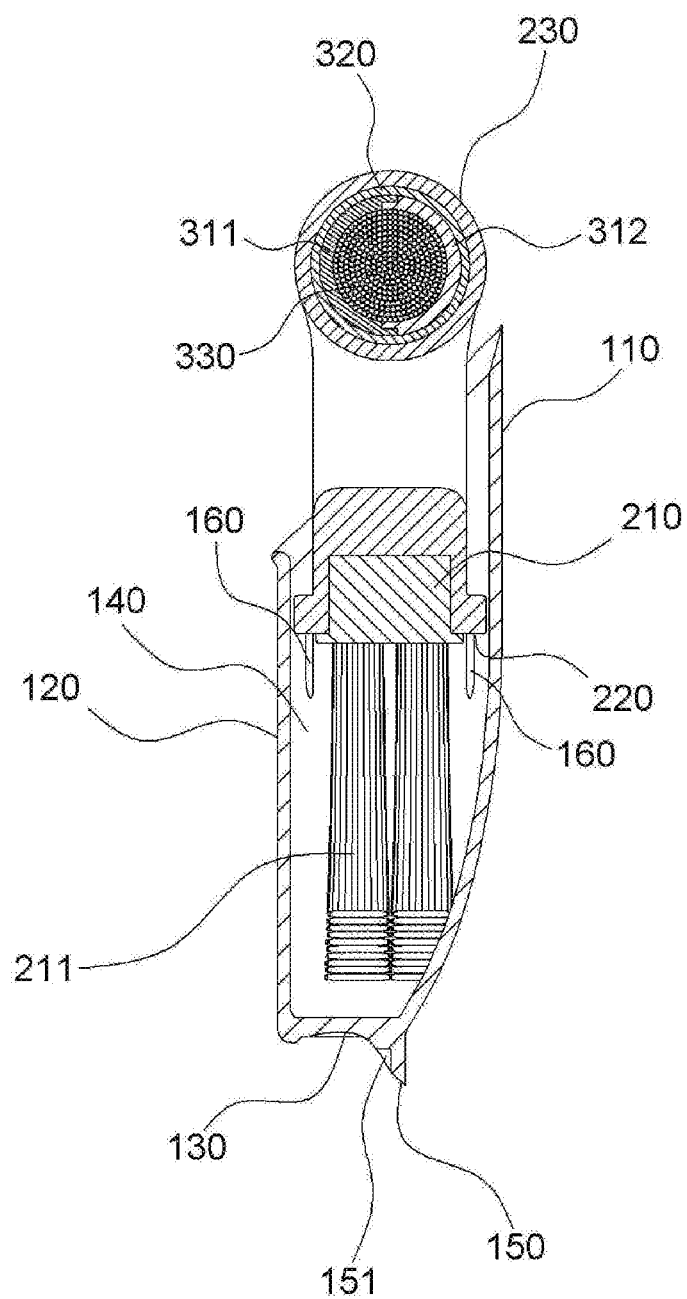
FIG. 3 is a sectional view taken along line A-A' of FIG. 1.

FIG. 3 is a sectional view taken along line A-A' of FIG. 1.

Figure 4:
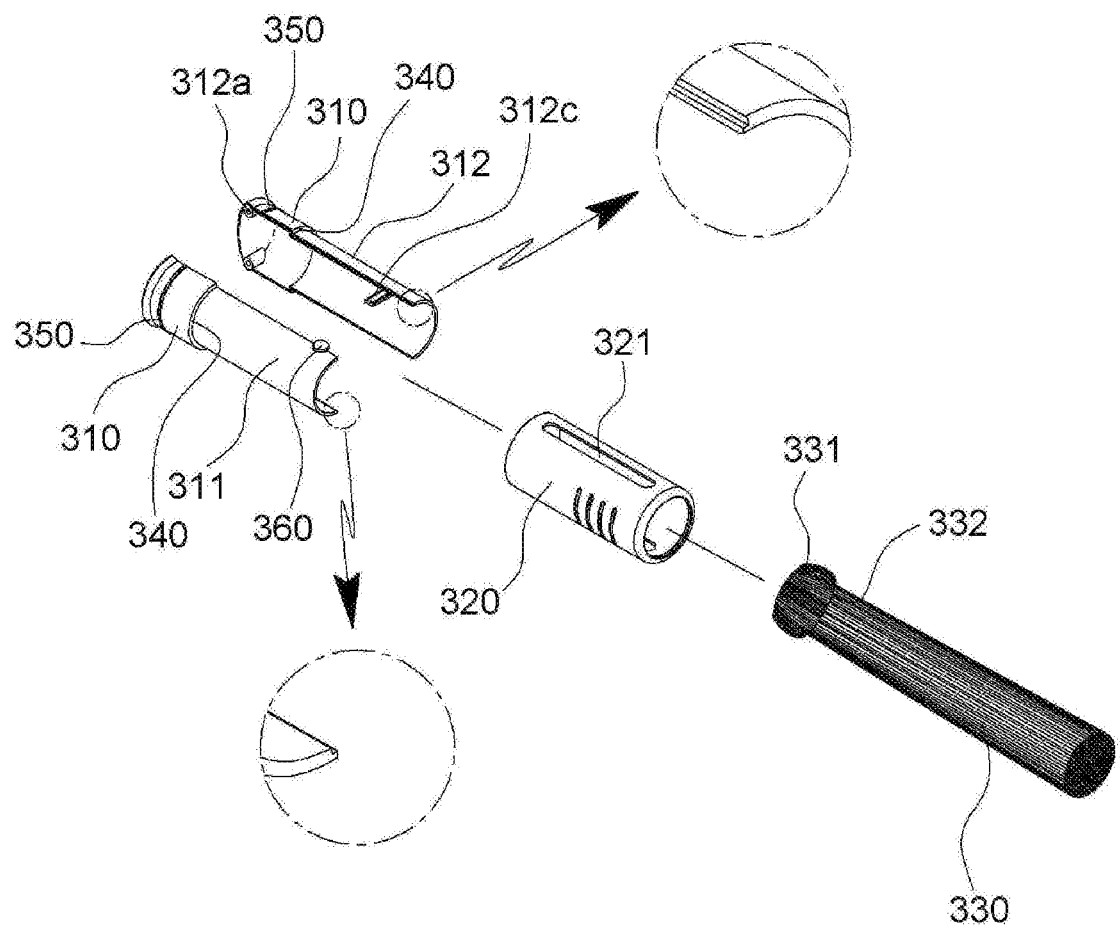
FIG. 4 is an exploded perspective view of the cleaning brush holder according to embodiment 1.

FIG. 4 is an exploded perspective view of the cleaning brush holder according to embodiment 1.

Figure 5A:
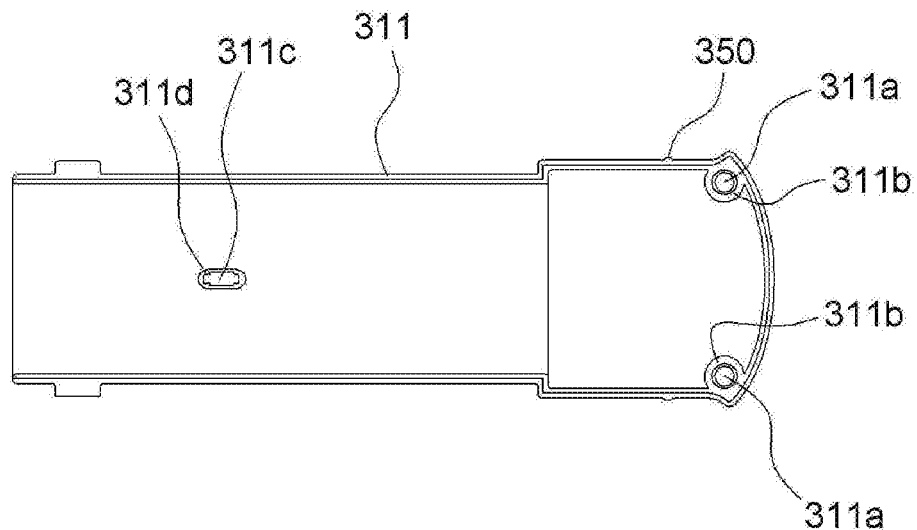
FIG. 5(a) is a schematic plan view of one handle piece of the cleaning brush holder, showing the inside thereof.
Figure 5B:
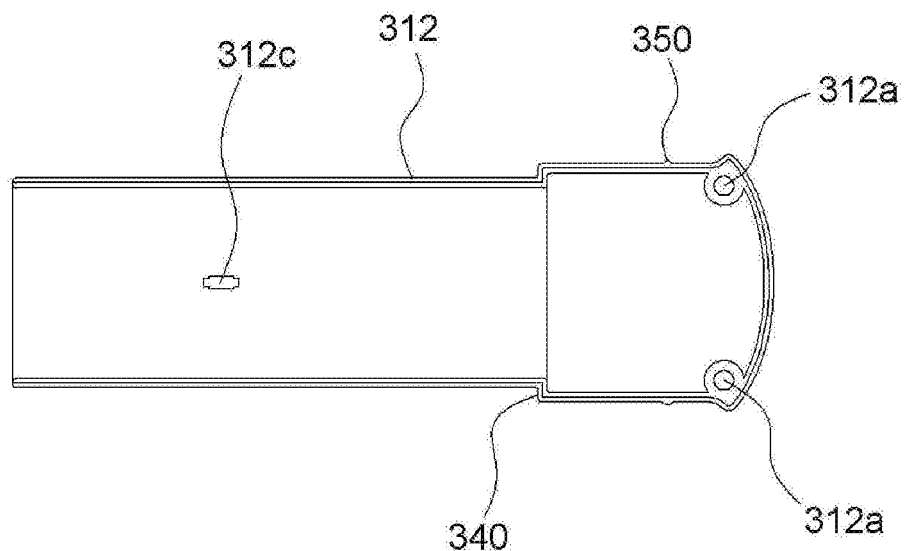
FIG. 5(b) is a schematic plan view of the other handle piece of the cleaning brush holder, showing the inside thereof.

FIG. 5(a) is a schematic plan view of one handle piece of the cleaning brush holder, showing the inside thereof, and FIG. 5(b) is a schematic plan view of the other handle piece of the cleaning brush holder, showing the inside thereof.

Figure 6A:
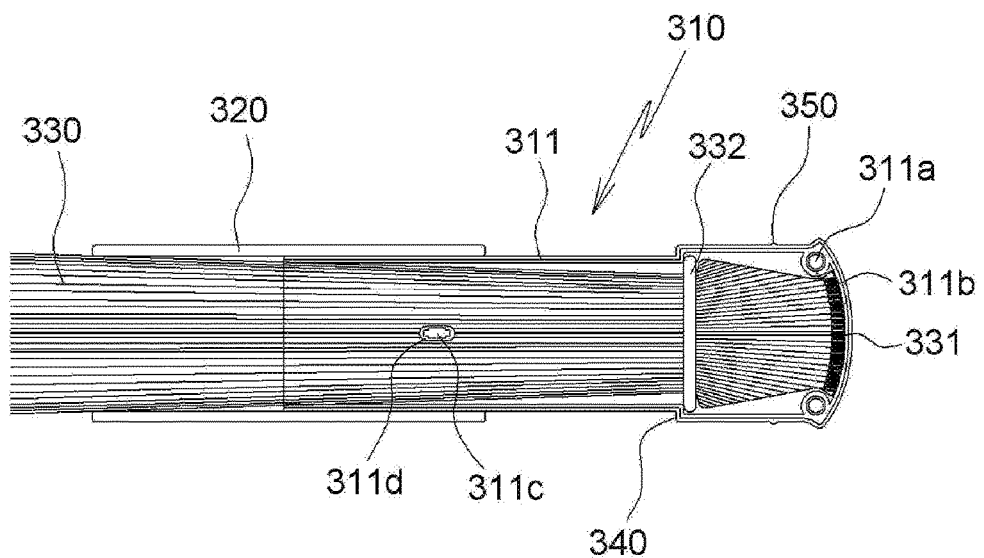
FIG. 6(a) is a sectional plan view of the cleaning brush holder according to embodiment 1, illustrating a state in which bristles of a cylindrical cleaning brush are gathered together inside the handle pieces of the cleaning brush holder by a sleeve.

FIG. 6(a) is a sectional plan view of the cleaning brush holder according to embodiment 1, illustrating a state in which bristles of a cylindrical cleaning brush are gathered together inside the handle pieces of the cleaning brush holder by a sleeve.

Figure 6B:
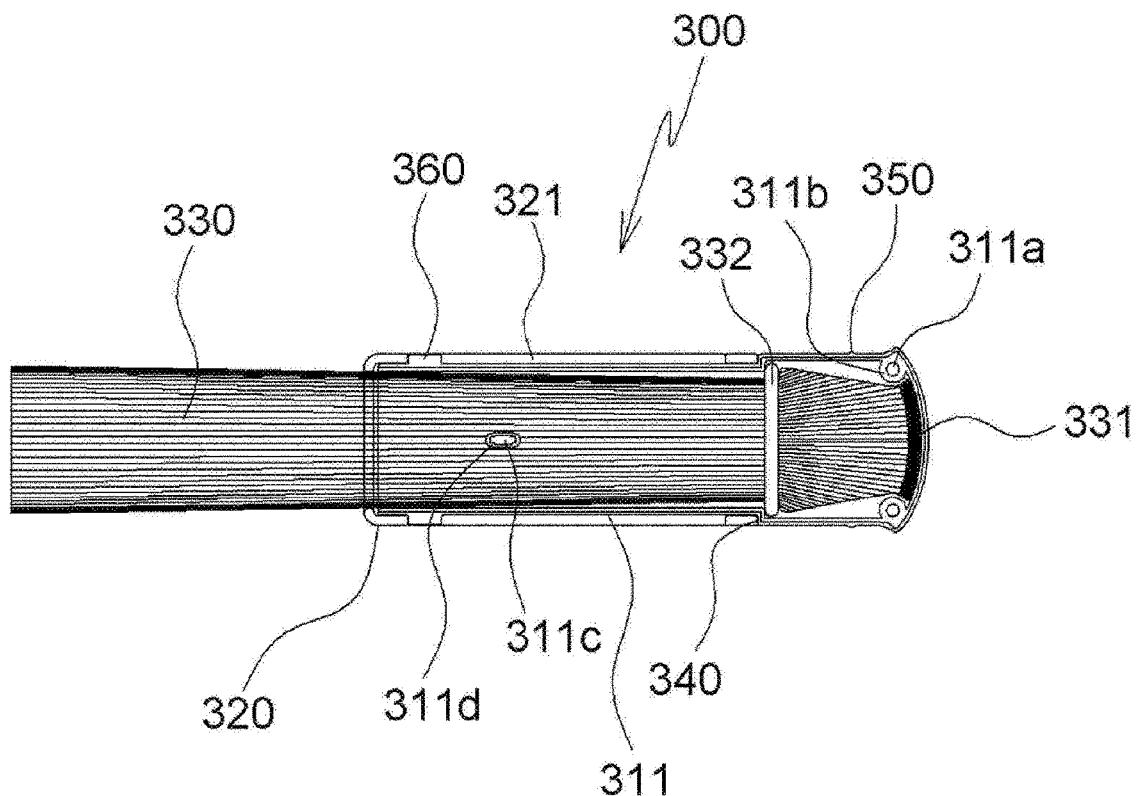
FIG. 6(b) is a longitudinal sectional view of the cleaning brush holder according to embodiment 1, illustrating a state in which a sleeve is moved such that the cleaning brush is ready for use.

FIG. 6(b) is a longitudinal sectional view of the cleaning brush holder according to embodiment 1, illustrating a state in which a sleeve is moved such that the cleaning brush is ready for use.

Figure 7:
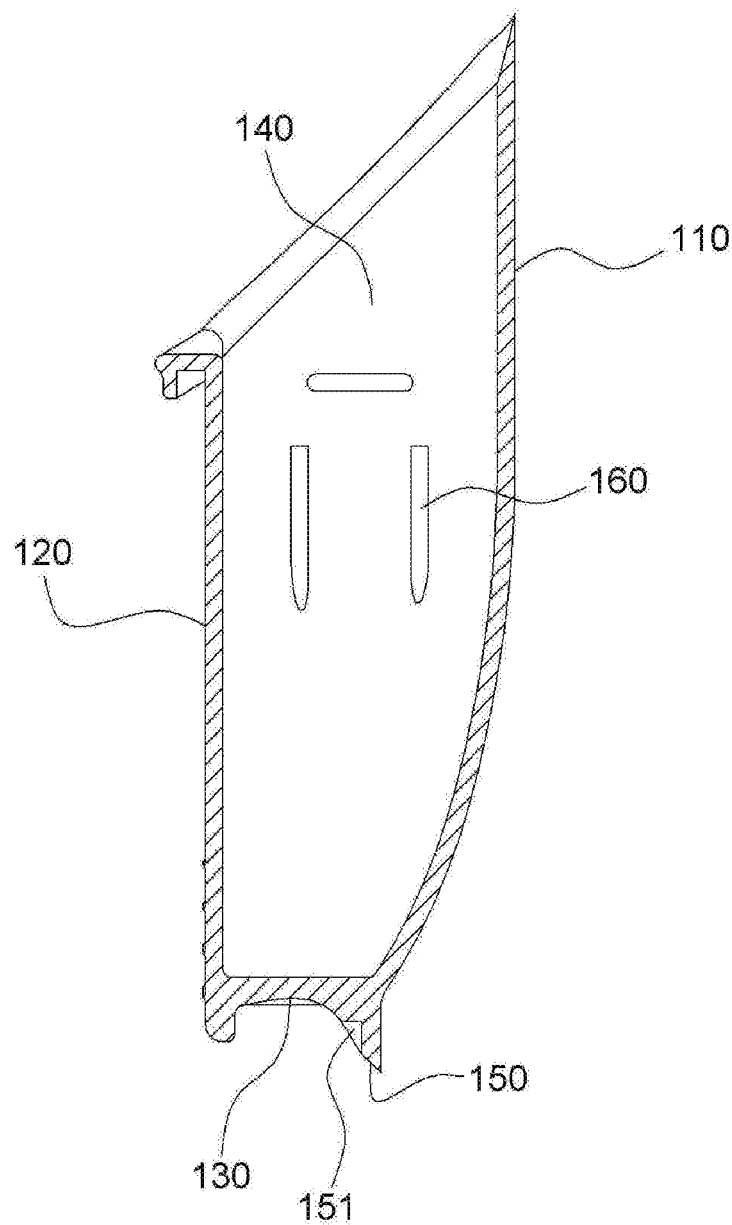
FIG. 7 is a longitudinal sectional view of the dustpan body.

FIG. 7 is a longitudinal sectional view of the dustpan body.

Figure 8:
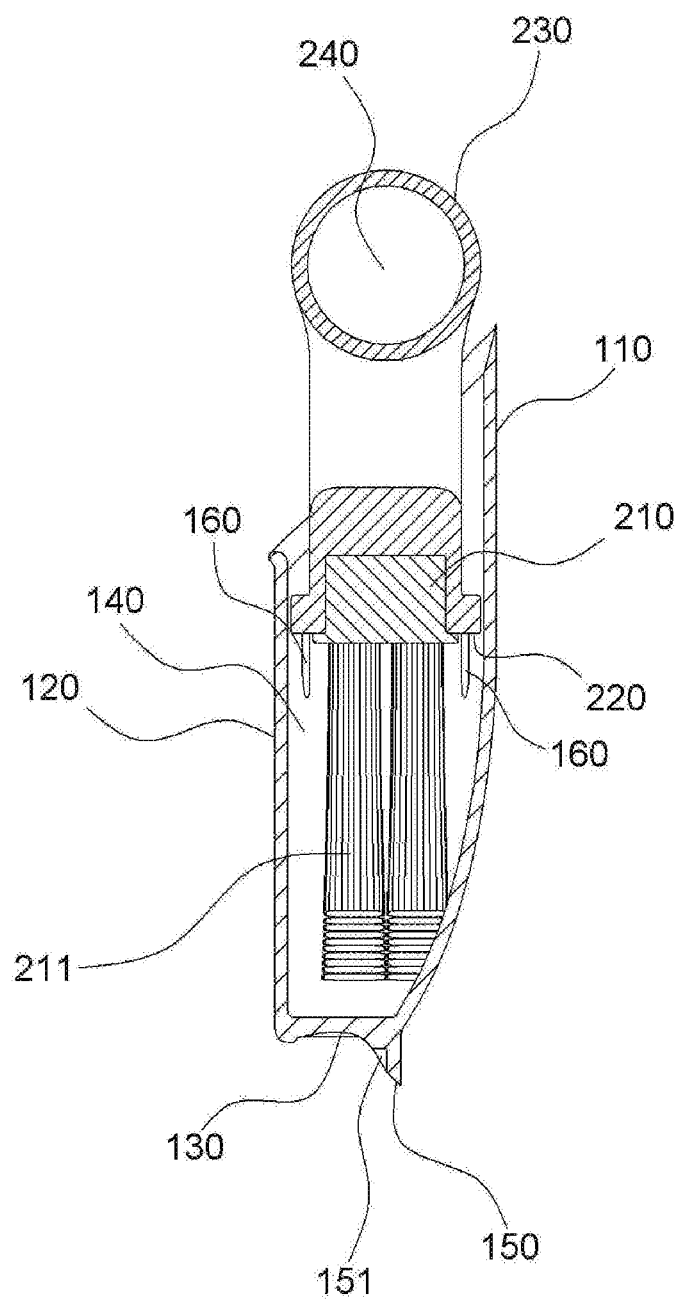
FIG. 8 is a longitudinal sectional view of the multipurpose cleaning kit, with the broom body inserted into and assembled with the dustpan body.

FIG. 8 is a longitudinal sectional view of the multipurpose cleaning kit, with the broom body inserted into and assembled with the dustpan body.

Figure 9:
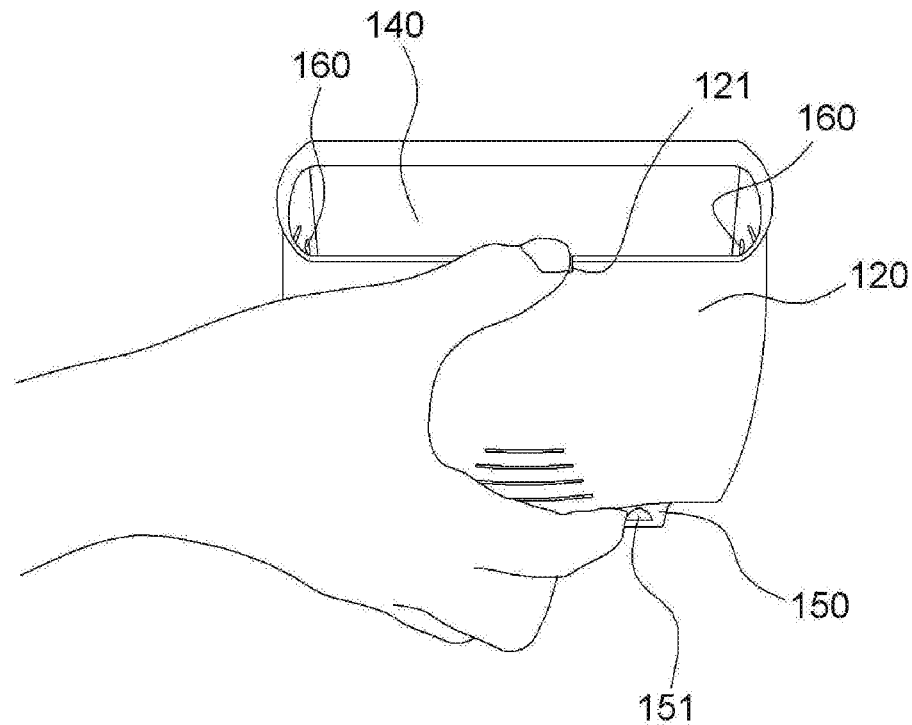
FIG. 9 is a view illustrating a state in which a user holds the dustpan body.

FIG. 9 is a view illustrating a state in which a user holds the dustpan body.

Figure 10:
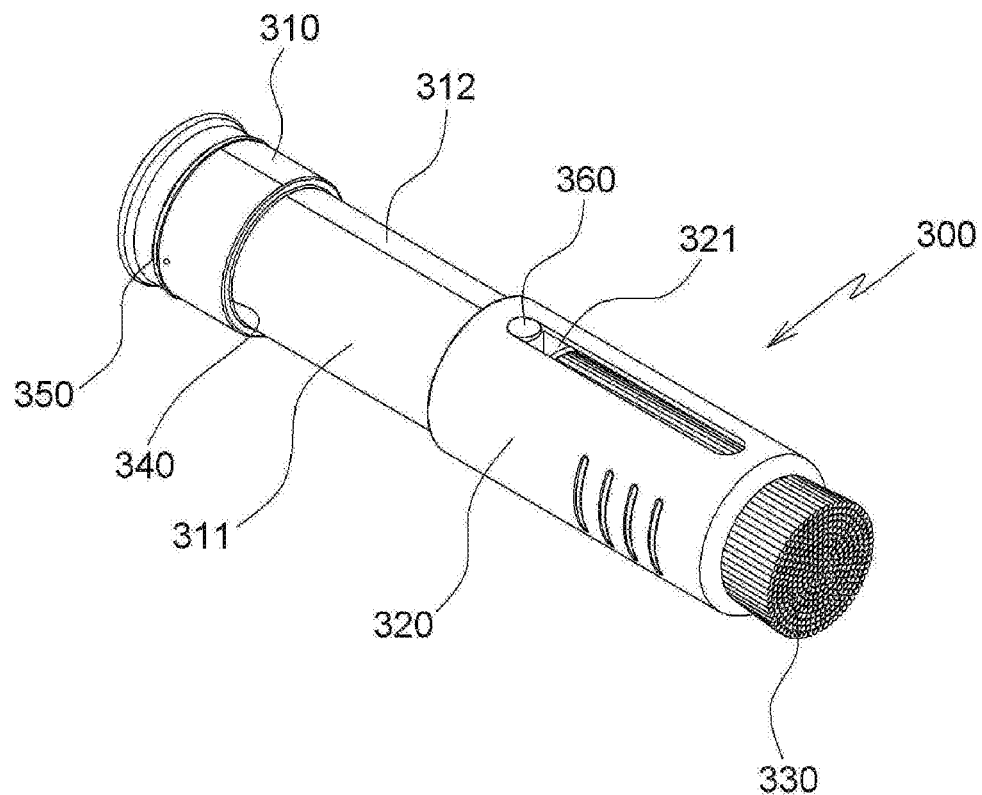
FIG. 10 is a front view of the cleaning brush holder according to embodiment 1, illustrating a state in which the cylindrical brush inside the handle pieces is allowed to retain a cylindrical shape by the sleeve.

FIG. 10 is a front view of the cleaning brush holder according to embodiment 1, illustrating a state in which the cylindrical brush inside the handle pieces is allowed to retain a cylindrical shape by the sleeve.

Figure 11:
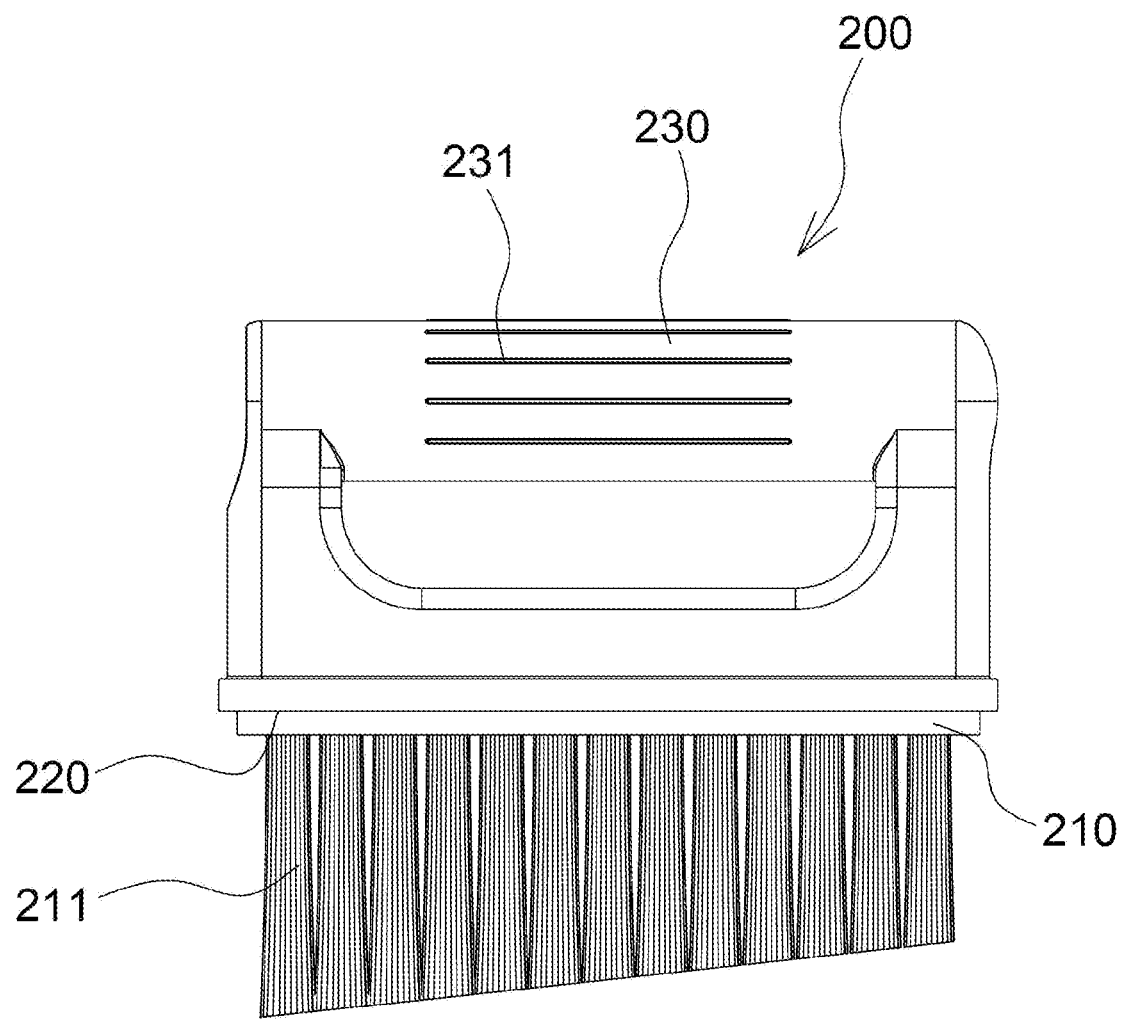
FIG. 11 is a front view of the broom body.

FIG. 11 is a front view of the broom body.

Figure 12A:
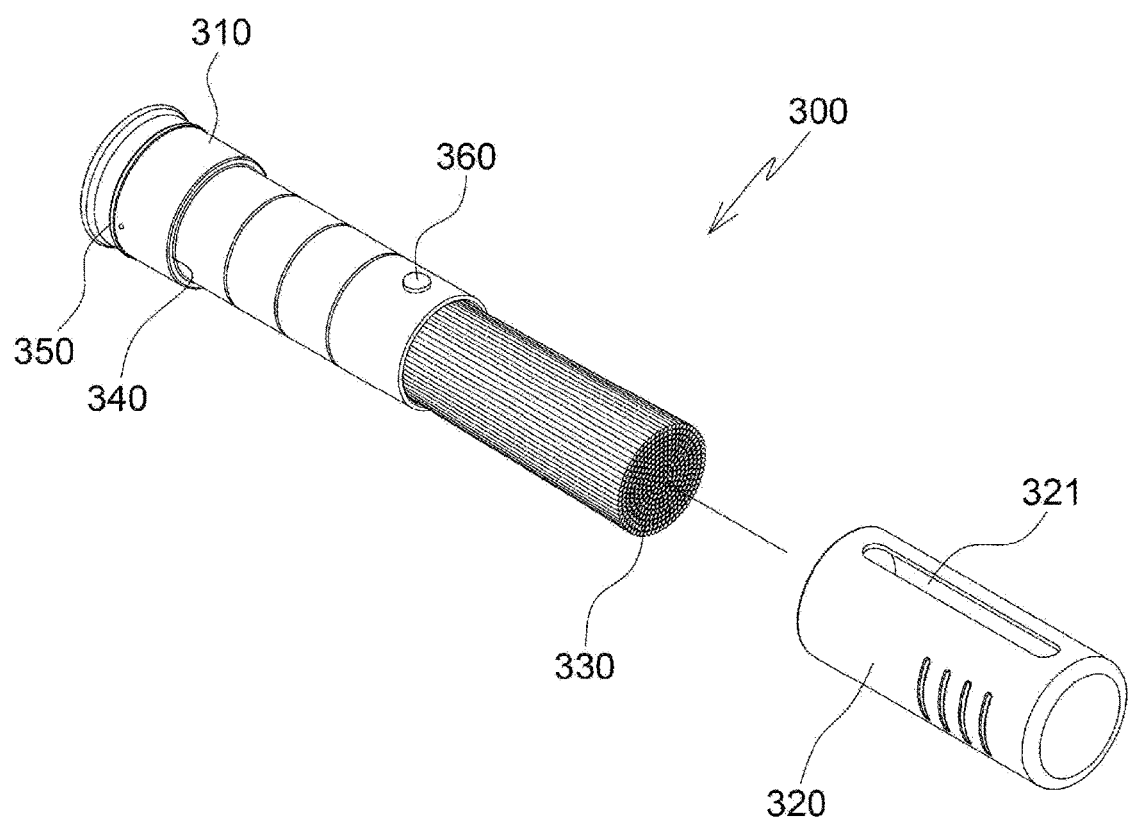
FIG. 12(a) is a perspective view of a cleaning brush holder according to embodiment 2, with a sleeve disassembled therefrom.

FIG. 12(a) is a perspective view of a cleaning brush holder according to embodiment 2, with a sleeve disassembled therefrom.

Figure 12B:
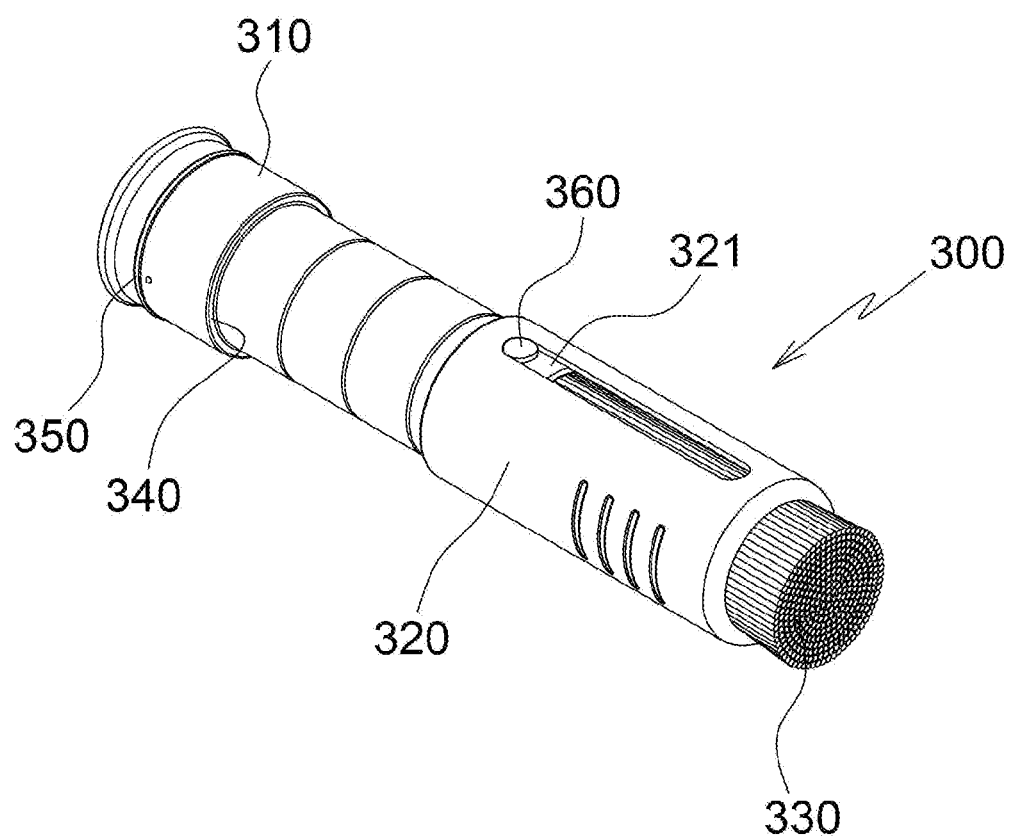
FIG. 12(b) is a perspective view of the cleaning brush holder according to embodiment 2, with the sleeve assembled therewith.

FIG. 12(b) is a perspective view of the cleaning brush holder according to embodiment 2, with the sleeve assembled therewith.

FIG. 13(a) is a longitudinal sectional view of the cleaning brush holder according to embodiment 2, illustrating a state in which bristles of a cleaning brush are gathered through movement of the sleeve (a state in which the cleaning brush holder is ready for insertion into a receiving hole of the broom body).

FIG. 13(b) is a longitudinal sectional view of the cleaning brush holder according to embodiment 2, illustrating a state in which a sleeve is moved such that the cleaning brush is ready for use.

A multipurpose cleaning kit according to the present invention includes a dustpan body 100 having an inner space 410 defined by a bottom surface 110, an upper surface 120, and a side surface 130 with a defrosting scraper 150 formed thereon, the inner space 410 being adapted for trash to be swept thereinto, wherein the dustpan body 100 is formed on both inner sidewalls thereof with a stopper preventing insertion of a broom body 200 into the dustpan body 100 beyond a predetermined depth, thereby preventing problems caused by bending of a brush 211 or contact of the brush 211 with a bottom of the inner space 140.

In addition, a gripping groove 121 is formed at the center of an edge of the upper surface 120 of the dustpan body 100 at an entrance side of the inner space 140 such that a user can conveniently hold the dustpan body 100.

That is, when a user places their thumb in the gripping groove 121 formed at the center of the edge of the upper surface 120 of the dustpan body 100 with the remaining fingers and palm grasping the defrosting scraper 150, as shown in FIG. 9, trash such as dust can be easily swept into the inner space 140.

In addition, the bottom surface 110 of the dustpan body 100 is finished to form a flexible curved portion toward the defrosting scraper 150.

The defrosting scraper 150 has semilunar recesses 151 formed at regular intervals on an upper surface thereof to efficiently clear frost or ice from windows of an automobile upon defrosting the windows.

Specifically, defrosting of the windows may be performed by inserting the broom body 200 described below into the inner space 140 of the dustpan body 100, placing a user's thumb on a lower surface of a cylindrical handle 230 of the broom body 200 with the remaining fingers and palm grasping both an upper surface of the broom body 200 and the upper surface 120 of the dustpan body 100, and moving the dustpan body 100 up and down with the defrosting scraper 150 pressed against the windows. Here, frost removed from the windows can be easily swept away using the brush 211 of the broom body 200.

Next, the broom body 200 will be described in detail.

The broom body 200 is inserted into and stored in the inner space 140 of the dustpan body 100 when not in use, and is withdrawn from the inner space 140 when in use. The broom body 200 has an insertion groove 220 formed on a lower surface thereof and adapted for a brush holder 210 retaining the brush 211 to be securely inserted thereinto, wherein the brush 211 may consist of a plurality of bundles of bristles having gradually longer lengths from one side of the brush to the other side of the brush.

Although the brush 211 may consist of a plurality of bundles of bristles having the same length, when the brush 211 consists of the plurality of bundles of bristles having gradually longer lengths from one side of the brush to the other side of the brush, it is possible to easily remove trash, such as dust, from a hard-to-reach place between a seatback and a seat cushion of a seat of an automobile using longer bristles of the brush 211.

The brush 211 is made ready for use by inserting the brush holder 210 into the insertion groove 220 formed on the lower surface of the broom body 200, followed by securing the brush holder 210 to the insertion groove 220 using an adhesive or fastening the brush holder 210 to the boom body 200 using a screw fastener or the like.

The cylindrical handle 230 is formed at an upper portion of the broom body 200 and has multiple anti-slip protrusions 231 formed at regular intervals on an outer surface of the cylindrical handle and extending long in a longitudinal direction of the cylindrical handle to prevent slipping of a user's hand.

In addition, the cylindrical handle 230 of the broom body 200 is formed therein with a long receiving hole 240 receiving a cleaning brush holder 300 therein. The cleaning brush holder 300 inserted into the receiving hole 240 includes a cylindrical cleaning brush 330, a laterally slidable sleeve 320, and a handle 310.

The handle 310 may be formed in one piece, or may consist of two handle pieces 311, 312.

When the handle 310 comprises two handle pieces 311, 312, the handle pieces 311, 312 each have a semi-cylindrical shape to form a cylindrical shape when assembled together. In addition, a sleeve catching projection 340 and a receiving hole catching projection 350 are circumferentially formed at an outer end of an outer surface of each of the handle pieces 311, 312. Here, the outer surface of each handle piece located between the sleeve catching projection 340 and the receiving hole catching projection 350 forms a grip by which a user can hold the handle 310.

Although the handle pieces 311, 312 have been described as having a semi-cylindrical shape, it will be understood that the present invention is not limited thereto and the handle pieces 311, 312 may have any other shape that allows the handle pieces 311, 312 to be assembled with and disassembled from each other.

Next, exemplary embodiments of the present invention will be described with reference to the accompanying drawings.

<Embodiment 1> A Cleaning Brush Holder Including a Handle Consisting of Two Handle Pieces In embodiment 1, in order to allow semi-cylindrical handle pieces 311, 312 to be assembled with and disassembled from each other, one handle piece 311 has: multiple first coupling protrusions 311b formed at both ends of an inner surface of the handle piece 311 and each having a coupling protrusion insertion hole 311a receiving a corresponding one of multiple coupling protrusions 312a formed on an inner surface of the other handle piece 312; and a second coupling protrusion 311d formed at the center of the inner surface of the handle piece 311 and having a brush securing protrusion insertion hole 311c to secure the cylindrical cleaning brush 330, as shown in FIG. 4, FIG. 5(a), and FIG. 5(b).

The other handle piece 312, which can be assembled with and disassembled from the handle piece 311, has: multiple coupling protrusions 312a formed at locations corresponding to respective coupling protrusion insertion holes 311a of the multiple first coupling protrusions 311b formed on the inner surface of the handle piece 311 to be securely inserted into the respective coupling protrusion insertion holes 311a; and a brush securing protrusion 312c formed at a location corresponding to the brush securing protrusion insertion hole 311c of the second coupling protrusion 311d formed on the inner surface of the handle piece 311 to be securely inserted into the brush securing protrusion insertion hole 311c. In this way, the handle pieces 311, 312 can be easily assembled with or disassembled from each other, as needed.

The cylindrical cleaning brush 330 is seated inside the handle piece 311. Here, upper ends of bristles of the cylindrical cleaning brush 330 are bonded together by thermal bonding using a heat source or the like to form a brush securing portion 331, and a portion of the cylindrical cleaning brush 330 at a predetermined distance from a lower end of the brush securing portion 331 is tied with a binder 332, such as a rubber band and a wire, to prevent a lower end of the cleaning brush 330 from widening, thereby allowing the cleaning brush 330 to retain a cylindrical shape thereof.

That is, when the handle piece 311 is coupled to the other handle piece 312 after the cleaning brush 330 having the brush securing portion 331 formed at the upper end thereof and tied with the binder 332, such as a rubber band and a wire, is placed inside the handle piece 311 while maintaining the cylindrical shape of the cleaning brush 330, as shown in FIG. 12, the cleaning brush 330 can be secured in place by the first and second coupling protrusions 311b, 311d, the coupling protrusion 312a, and the brush securing protrusion 312c while the handle 310 is formed through coupling between the handle pieces 311, 312.

In addition, the handle piece 311 or 312 has a control protrusion 360 formed at an end of the outer surface thereof, at which the cleaning brush 330 is exposed, to prevent the sleeve 320, which is laterally slidable along the outer surfaces of the handle pieces 311, 312, from being separated from the handle pieces 311, 312. Further, the sleeve 320 has a slit 321 formed through both upper and lower portions thereof and fitted to the control protrusion 360 formed on the outer surface of the handle piece 311 or 312 with one inner end thereof adjoining the control protrusion 360.

The handle pieces 311, 312 may be formed of a flexible synthetic resin such that the control protrusion 360 can be inserted into the slit 321 of the sleeve 320 by slightly pressing a portion of the handle piece 311 or 312, at which the control protrusion 360 is formed.

<Embodiment 2> A Cleaning Brush Holder Including a Cylindrical One-Piece Handle

In embodiment 1, the handle 310 comprises the two handle pieces 311, 312, which can be assembled together or disassembled from each other. In embodiment 2, the handle 310 is an inseparable one-piece product.

The cylindrical cleaning brush 330 tied with a rubber band or a wire is secured in the handle 310.

That is, the cleaning brush holder 300 integrally formed with the cylindrical cleaning brush 330 is obtained by injection molding of the cleaning brush holder 300 in a mold with the cleaning brush 330 placed therein.

The cleaning brush holder 300 according to embodiment 2 has substantially the same structure, operation, and effects as the cleaning brush holder according to embodiment 1 except that the cleaning brush holder 300 according to embodiment 2 is integrally formed with the cleaning brush 330.

Accordingly, the handle 310 of the cleaning brush holder 300 has a control protrusion 360 formed at an end of the outer surface thereof, at which the cleaning brush 330 is exposed, to prevent the sleeve 320, which is slidable along the outer surface of the handle 310, from being separated from the handle 310. In addition, the sleeve 320 has a slit 321 formed through both upper and lower portions thereof and fitted to the control protrusion 360 with one inner end of the slit 321 adjoining the control protrusion 360.

In addition, the handle 310 may be formed of a flexible synthetic resin such that the control protrusion 360 can be inserted into the slit 321 of the sleeve 320 by slightly pressing a portion of the handle 310, at which the control protrusion 360 is formed.

Since the operation and effects of the other components of the cleaning brush holder according to embodiment 2 are substantially the same as those of the cleaning brush holder according to embodiment 1, description thereof will be omitted.

In embodiments 1 and 2 according to the present invention, a height of the control protrusion 360 from the outer circumferential surface of the handle 310 may be slightly smaller than a wall thickness of the sleeve 320 and a width (diameter) of the control protrusion 360 may be slightly smaller than a thickness of the slit 321 of the sleeve 320 such that the sleeve 320 can be smoothly slid along the outer circumferential surface of the handle 310.

When not in use, the cleaning brush holder 300 is inserted into and stored in the receiving hole 240 of the broom body 200 with the sleeve 320 located over an outer surface of the cylindrical cleaning brush 330. Here, the sleeve 320 prevents the cylindrical cleaning brush 330 from widening, thereby allowing the cylindrical cleaning brush 330 to retain the original shape thereof. In addition, when the cleaning brush holder 300 is inserted back into the receiving hole 240 of the broom body 200 after use, the cylindrical sleeve 320 inwardly gathers bristles of the cleaning brush 330 spread out during use to prevent the bristles from interfering with insertion of the cleaning brush holder 300 into the receiving hole 240.

When the sleeve 320 is moved toward the handle 310 with the cleaning brush holder 300 withdrawn from the receiving hole 240 of the broom body 200, the cylindrical cleaning brush 330 is exposed from the sleeve 320 to be ready for use to clean hard-to-reach places inside an automobile, such as air vents and cracks, which are difficult to clean using a normal brush.

In addition, debris stuck in seats of an automobile, which seems to be difficult to remove using the cleaning brush 330, can be easily removed using a lower end of the cleaning brush 330 strengthened by moving the sleeve 320 as close as possible to the lower end of the cleaning brush 330, as shown in FIG. 6(a) and FIG. 10.

That is, a user of the cleaning brush 330 can adjust flexural strength of the cleaning brush 330 by adjusting an exposed length of the cleaning brush 330 outside the sleeve 320 through sliding of the sleeve 320 along the outer portion of the cleaning brush 330, depending on where or in what environment the cleaning brush 330 is used. That is, the cleaning brush 330 can be adjusted to different lengths to be used in various applications depending on where or in what environment the cleaning brush 330 is used, thereby providing numerous benefits to users.

Since the cleaning brush holder 300 according to embodiment 1 can be disassembled in reverse order to the assembly process as described above, anyone can easily replace the cylindrical cleaning brush 330. Accordingly, the service life of the cleaning kit according to the present invention can be prolonged simply by purchasing the cylindrical cleaning brush 330 separately.

When the cleaning brush holder 300 according to embodiment 2 is employed, the service life of the cleaning kit according to the present invention can be prolonged by replacing only the cleaning brush holder 300 or by replacing the cleaning brush holder 300 together with the sleeve 320.

It should be understood that embodiments described herein are provided for illustration only and are not to be construed in any way as limiting the present invention, that the scope of the present invention is defined by the appended claims rather than the detailed description herein, and that all modifications, changes, and alterations conceivable from the appended claims and equivalents thereto are construed as falling within the scope of the present invention.

<List of Reference numerals>

| | |
|---|---|
| 100: Dustpan body | 110: Bottom surface |
| 120: Upper surface | 121: Gripping groove |
| 130: Side surface | 140: Inner space |

<List of Reference numerals>

| | |
|---|---|
| 150: Defrosting scraper | 151: Semilunar recess |
| 160: Stopper | 200: Broom body |
| 210: Brush holder | 211: Brush |
| 220: Insertion groove | 230: Cylindrical handle |
| 231: Anti-slip protrusion | 240: Receiving hole |
| 300: Cleaning brush holder | 310: Handle |
| 311, 312: Handle piece | 311a: Coupling protrusion insertion hole |
| 311b: First coupling protrusion | 311c: Brush securing protrusion insertion hole |
| 311d: Second coupling protrusion | 312a: Coupling protrusion |
| 312c: Brush securing protrusion | 320: Sleeve |
| 321: Slit | 330: Cleaning brush |
| 331: Brush securing portion | 332: Binder |
| 340: Sleeve catching projection | 350: Receiving hole catching projection |
| 360: Control protrusion | |

What is claimed is:

1. A multipurpose cleaning kit comprising:
a dustpan body having an inner space defined by a bottom surface, an upper surface and a side surface with a defrosting scraper formed thereon, the inner space being adapted for trash to be swept thereinto;
a broom body comprising an insertion groove formed at a lower portion thereof to allow a brush holder retaining a brush to be securely inserted thereinto and a cylindrical handle formed at an upper portion thereof and having a receiving hole receiving a cleaning brush holder therein; and
the cleaning brush holder comprising a handle, a sleeve, and a cylindrical cleaning brush retained in the handle,
wherein the broom body is insertable into the inner space of the dustpan body,
the cleaning brush holder is retractably inserted into the cylindrical handle of the broom body, and
the handle retaining the cylindrical cleaning brush is movable back and forth inside the sleeve.

2. The multipurpose cleaning kit according to claim 1, wherein the dustpan body has a stopper protruding from both inner side walls of the dustpan body to prevent insertion of the broom body into the dustpan body beyond a predetermined depth.

3. A multipurpose cleaning kit comprising a dustpan body, a broom body, and a cleaning brush holder,
wherein the cleaning brush holder comprises a handle retaining a cylindrical cleaning brush integrally formed with the cleaning brush holder and a sleeve laterally slidable along an outer surface of the handle,
the handle having a control protrusion formed at an end of the outer surface thereof, at which the cylindrical cleaning brush is exposed, to prevent the sleeve from being separated from the handle,
the sleeve having a slit formed through both upper and lower portions thereof and fitted to the control protrusion with one inner end of the slit adjoining the control protrusion,
the sleeve being slidable along an outer surface of the cleaning brush to facilitate insertion of the cylindrical cleaning brush and the sleeve into a receiving hole of the broom body.

4. The multipurpose cleaning kit according to claim 3, wherein the sleeve is slidable along the outer surface of the cylindrical cleaning brush to allow adjustment of flexural strength of the cylindrical cleaning brush through adjustment of an exposed length of the cylindrical cleaning brush outside the sleeve while preventing the cylindrical cleaning brush from widening.

5. A multipurpose cleaning kit comprising a dustpan body, a broom body, and a cleaning brush holder,
wherein:
the cleaning brush holder comprises a handle retaining a cylindrical cleaning brush therein and a sleeve;
the handle comprises two handle pieces such that the sleeve is laterally slidable along an outer surface of the handle; and
each of the handle pieces has a semi-cylindrical shape and comprises a sleeve catching projection and a receiving hole catching projection each circumferentially formed at an outer end of an outer surface thereof, and the outer surface of each handle piece located between the sleeve catching projection and the receiving hole catching projection forms a grip by which a user holds the handle, wherein:
one of the handle pieces has a control protrusion formed at an end of the outer surface thereof, at which the cleaning brush is exposed, to prevent the sleeve from being separated from the handle; and
the sleeve has a slit formed through both upper and lower portions thereof and fitted to the control protrusion with one inner end of the slit adjoining the control protrusion.

\* \* \* \* \*